United States Patent [19]
Carlstrom, Jr. et al.

[11] Patent Number: 6,015,633
[45] Date of Patent: Jan. 18, 2000

[54] FLUID FLOW PLATE FOR WATER MANAGEMENT, METHOD FOR FABRICATING SAME, AND FUEL CELL EMPLOYING SAME

[75] Inventors: Charles M. Carlstrom, Jr., Clifton Park; William P. Acker, Rexford, both of N.Y.

[73] Assignee: Plug Power, L.L.C., Latham, N.Y.

[21] Appl. No.: 09/168,232

[22] Filed: Oct. 7, 1998

[51] Int. Cl.[7] .................................................. H01M 8/04
[52] U.S. Cl. .............................. 429/13; 429/30; 429/34; 429/39; 29/623.1
[58] Field of Search ................................ 429/30, 32, 34, 429/38, 39, 13; 29/623.1

[56] References Cited

U.S. PATENT DOCUMENTS

| | | | |
|---|---|---|---|
| 3,516,867 | 6/1970 | Dankese | 136/86 |
| 4,463,068 | 7/1984 | Cohn et al. | 429/34 |
| 4,631,239 | 12/1986 | Spurrier et al. | 429/39 |
| 4,729,932 | 3/1988 | McElroy et al. | 429/34 |
| 4,826,741 | 5/1989 | Aldhart et al. | 429/19 |
| 4,876,162 | 10/1989 | McElroy | 429/13 |
| 4,973,530 | 11/1990 | Vanderborgh et al. | 429/13 |
| 5,206,094 | 4/1993 | Katz | 429/26 |
| 5,252,410 | 10/1993 | Wilkinson et al. | 429/32 X |
| 5,382,478 | 1/1995 | Chow et al. | 429/30 X |
| 5,529,855 | 6/1996 | Watanabe | 429/34 |
| 5,565,279 | 10/1996 | Fredley et al. | 429/26 |
| 5,641,586 | 6/1997 | Wilson | 429/30 |
| 5,840,414 | 11/1998 | Bett et al. | 429/34 X |

*Primary Examiner*—Stephen Kalafut
*Attorney, Agent, or Firm*—Heslin & Rothenberg, P.C.

[57] ABSTRACT

A fluid flow plate includes a generally porous portion and a generally non-porous portion which together form on a first surface of the plate, a flow channel having at least one turn for distributing a reactant gas in a fuel cell. The porous portion defines an outer lateral portion of the at least one turn. Such fluid flow plate(s) provide a water management scheme for a fuel cell and/or fuel cell assembly in which the turn(s) in a flow channel of the fluid flow plate(s) are used for multi-point per flow channel addition, removal, and/or redistribution of water for regulation of the humidity of a stream of reactant gas for membrane hydration and/or cooling. Desirably, for removal of water, the inertia of large water droplets moving along with the reactant gas through the flow channel impact the porous portion which forms the outer lateral portion of the turn(s).

38 Claims, 11 Drawing Sheets

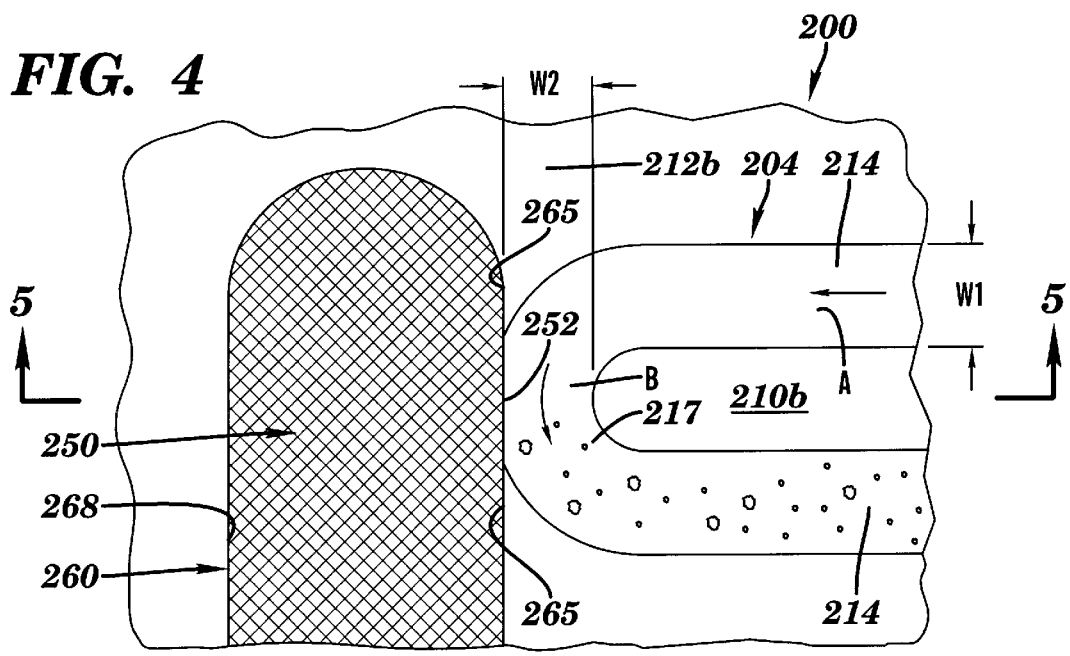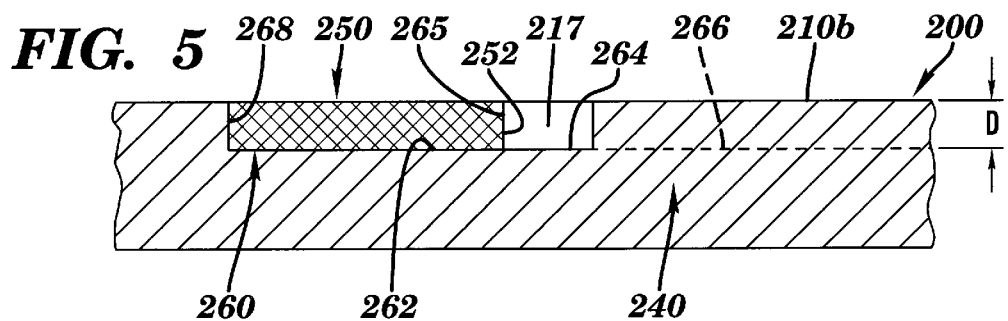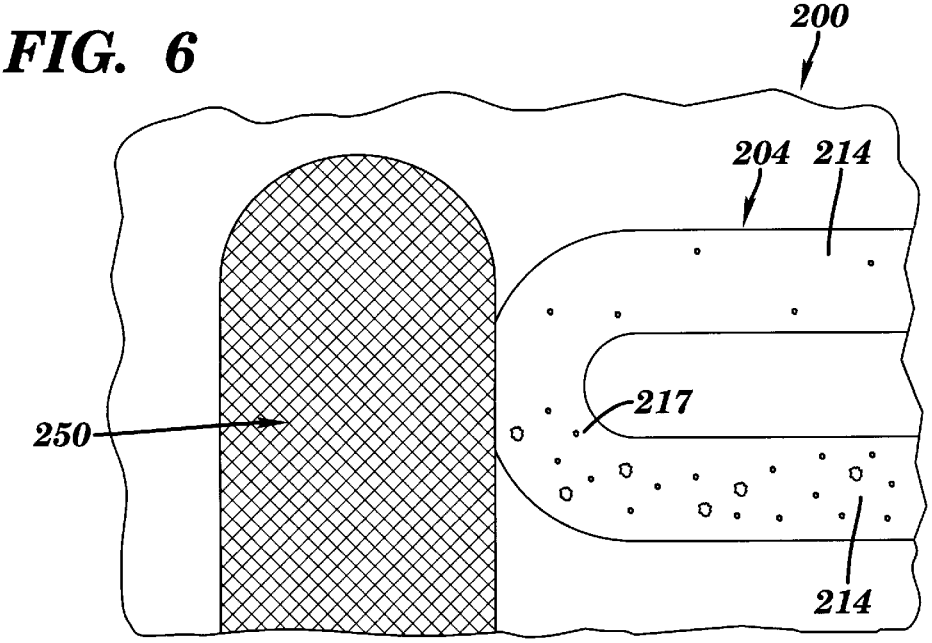

FLUID FLOW PLATE FOR WATER MANAGEMENT, METHOD FOR FABRICATING SAME, AND FUEL CELL EMPLOYING SAME

CROSS REFERENCE TO RELATED APPLICATIONS

This application relates to the following commonly assigned, U.S. Patent Applications:

U.S. patent application Ser. No. 09/167,359, Attorney Docket No. 1404.027, entitled "Fuel Cell Assembly Unit For Promoting Fluid Service and Design Flexibility" which is concurrently filed herewith; and U.S. patent application Ser. No. 08/839,667, Attorney Docket No. 1404.016, entitled "Insertable Fluid Flow Passage Bridgepiece and Method," filed Apr. 15, 1997.

These applications are hereby incorporated by reference herein in their entirety.

TECHNICAL FIELD

This invention relates generally to fuel cells and, more particularly, to novel fluid flow plates configured for addition, removal, and/or redistribution of water to regulate the humidity of reactant gases in fuel cells for membrane hydration and/or cooling.

BACKGROUND INFORMATION

Fuel cells electrochemically convert fuels and oxidants to electricity. Fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many (e.g., automotive to aerospace to industrial) environments, for multiple applications.

A Proton Exchange Membrane (hereinafter "PEM") fuel cell converts the chemical energy of fuels such as hydrogen and oxidant such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As is known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell. Also, other fluid supply manifolds circulate coolant (e.g., water) for cooling.

The PEM can be made using, for instance, a polymer such as the material manufactured by E. I. Du Pont De Nemours Company and sold under the trademark NAFION®. Further, an active electrolyte such as sulfonic acid groups is included in this polymer. In addition, the PEM is available as a product manufactured by W.L. Gore & Associates (Elkton, Md.) and sold under the trademark GORE-SELECT®. Moreover, a catalyst such as platinum which facilitates chemical reactions is applied to each side of the PEM. This unit is commonly referred to as a membrane electrode assembly (hereinafter "MEA"). The MEA is available as a product manufactured by W.L. Gore & Associates and sold under the trade designation PRIMEA 5510-HS.

In a typical PEM-type fuel cell, the MEA is sandwiched between "anode" and "cathode" gas diffusion layers (hereinafter "GDLs") that can be formed from a resilient and conductive material such as carbon fabric or paper. The anode and cathode GDLs serve as electrochemical conductors between catalyzed sites of the PEM and the fuel (e.g., hydrogen) and oxidant (e.g., air/oxygen) which flow in respective "anode" and "cathode" flow channels of respective flow field plates.

A given fluid flow plate can be formed from a conductive material such as graphite. Flow channels are typically formed on one or more faces of the fluid flow plate by machining. As is known in the art, a particular fluid flow plate may be a bipolar, monopolar, anode cooler, cathode cooler, or cooling plate.

Flow field plates are commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Usually, each flow field plate is subjected to a sealing process (e.g., resin impregnation) in order to decrease gas permeation therethrough and reduce the risk of uncontrolled reactions. Typically, flow field channels are engraved or milled into a face of the rigid, resin impregnated graphite plate.

As is well-known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely.

Attempts have been made to introduce water into the PEM by raising the humidity of the incoming reactant gases. That is, the fuel and oxidant gases are often humidified with water vapor before entering the fluid supply manifolds in order to convey water vapor for humidification of the PEM of the fuel cell.

For example, humidification of reactant gases (e.g., fuel and oxidant) is typically attempted by preconditioning the reactant gases at or before introduction of the reactant gases to the flow channels in a fluid flow plate. One method uses externally produced saturated air or hydrogen. Another method uses water injection at the start of each flow channel. Attempts to humidify or pre-mix the correct amount of water to reactant gas are problematic due to the following:

1. The water requirements are not constant from the start of a flow channel to the end of the flow channel;
2. Injecting large amounts of water in order to provide sufficient water and/or humidification at the end of the flow channel often creates one or more cold, wet spots in the cell adding to non-uniform operating temperature distributions and cell performance;

3. Injecting a set amount of water for the entire channel length at the start is often too much for the first quadrant, and too little further downstream;
4. Water requirements across the fuel cell, and along the length of a fuel cell stack, are not uniform but are dynamic and related to cell current densities;
5. Excess water may lead to localized flooding; and
6. Channel dimensions are too small for effective atomization of injected water.

Problems also result from the use of water vapor in humidification of the reactant gases. For example, significant quantities of heat are required in order to saturate a reactant gas at a temperature close to the temperature of the fuel cell. In particular, waste heat from a cell cooling circuit is not sufficient, because the temperature will necessarily be lower than the cell temperature. Furthermore, temperature variations within the reactant gas supply manifolds and fuel cell plate channels can undesirably lead to condensation of the vapor and poor distribution of the reactant gas and vapor/water.

Deleterious effects can also result from turns in the flow path of a stream which is a mixture of water droplets and reactant gas (e.g., two-phase flow). After the stream goes around a given curve, separation of the water from the reactant gas occurs. Anytime the stream changes direction and/or velocity, the various settling rates yield separation. Therefore, by the time the stream reaches the end of such a flow path, most of the liquid water will have settled out. Similar problems and unpredictability can result in any unconstrained flow of water mixed with reactant gas.

Naturally, fuel cells within the same assembly or stack can have varying efficiencies. In particular, some fuel cells generate more heat than others. A fuel cell running hot will require more water in order to function. If a fuel cell assembly delivers inadequate moisture to a given fuel cell, then the PEM of that fuel cell begins to dry out, which causes it to run hotter since the remaining fuel cells in the assembly continue to force high current therethrough. When the PEM of a fuel cell completely dries out, that fuel cell begins to dry out adjacent fuel cells. Accordingly, it is desirable to deliver adequate water to all the fuel cells in the stack.

Additional problems stem from height variations in different areas of an individual fuel cell and the fuel cell assembly, e.g., a fuel cell assembly disposed on an angle and sloping upward from an entry end of a longitudinal reactant fluid supply manifold. The injection of water at the entry of the fluid supply manifold into the fuel cell assembly undesirably results in fuel cells on the low end receiving all water and no gas ("PEM flooding"), and fuel cells on the high end receiving all gas and no water ("PEM starvation").

U.S. Pat. No. 4,973,530 to Vanderborgh et al., entitled "Fuel Cell Water Transport," discloses a serpentine flow field plate for repeatedly passing a fuel cell gas from a reactant flow field to a water transport field, and a membrane plate with a support frame for holding and separating an ion exchange membrane and a water transport membrane. The water transport membrane spans across top portions of the flow channels to define the water transport field. Liquid water on a first face of the water transport membrane is transported across the membrane to an opposite face to control the moisture content of the reactant gas. The water transport system disclosed in Vanderborgh et al. increases the cross-sectional dimensions a fuel cell assembly and increases the thickness of each fuel cell which reduces the overall current density of the fuel cell assembly.

Therefore, there exists a need for compact fluid flow plates which provide substantially uniform and sufficient membrane hydration and/or cooling.

SUMMARY OF THE INVENTION

The shortcomings of the prior art are overcome and additional advantages provided according to the present invention by a fluid flow plate which utilize turns in a flow channel for multi-point addition, removal, and/or redistribution of water for regulation of the humidity of reactant gases in a fuel cell. In one embodiment, the fluid flow plate includes a generally porous portion and a generally non-porous portion together forming on a first surface of the plate, a flow channel having at least one turn for distributing a reactant gas in a fuel cell. The porous portion defines an outer lateral portion of the at least one turn of the flow channel for regulating the humidity of the reactant gas in the flow channel.

The porous portion may be operable to add water to the reactant gas for adding water to humidify and/or increase the humidity of the reactant gas, to remove water from the reactant gas for decreasing the humidity of the reactant gas, and when the flow channel comprises a plurality of turns and the porous portion forms outer lateral portions of the plurality of turns, to redistribute water from one of the plurality of turns to a different one of the plurality of turns of the flow channel (e.g., redistributing water from wet regions to drier regions). In addition, the porous portion may be operable for adding water for cooling the fuel cell.

In another aspect of the present invention, a fluid flow plate comprises a plate having a flow channel with at least one turn for distributing a reactant gas in a fuel cell. The plate has a plate portion which defines an outer lateral portion of the at least one turn, and means (e.g., slots and/or wherein the turn acts as a venturi) is provided for supplying water to the flow channel via the plate portion.

In another aspect of the present invention, a fuel cell comprises a PEM membrane having a first surface and a second surface, a first fluid flow plate, as described above, for distributing and regulating the humidity of a first reactant gas to the first surface of the membrane, and a second fluid flow plate for distributing a second reactant gas to the second surface of the membrane. Desirably, the second fluid flow plate comprises a fluid flow plate as described above.

In another aspect of the present invention, a method is provided for regulating the humidity of a reactant gas in a fuel cell. The method includes the steps of flowing a reactant gas through a flow channel comprising at least one turn, and regulating the humidity of the reactant gas through an outer lateral portion of the at least one turn. Desirably, the step of regulating the humidity of the reactant gas comprises the step of removing water, adding water, and/or redistributing water via a porous material defining the outer lateral portion of the at least one turn.

In still another aspect of the present invention, a method is provided for forming a fluid flow plate of a fuel cell in which the method comprises the steps of forming a flow channel having at least one turn on a first surface of the plate, and defining an outer lateral portion of the at least one turn with a porous portion of the plate. Desirably, the step of forming the flow channel comprises the steps of forming a flow channel having a serpentine configuration, and forming a recess in which a porous material is receivable to define the porous portion of the plate.

Such embodiments of the present invention enable regulation of the hydration of a reactant gas in the fuel cell to achieve generally uniform and sufficient membrane hydration and/or cooling.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 4 is an enlarged, partial view of detail 4 of FIG. 2, illustrating the addition of water to humidify a stream of reactant gas;

FIG. 5 is an enlarged, sectional view taken along line 5—5 of FIG. 4;

FIG. 6 is an enlarged, partial view of detail 6 of FIG. 2, illustrating the addition of water to increase the humidity of a stream of reactant gas and water droplets;

DETAILED DESCRIPTION OF THE PREFERRED EMBODIMENTS

The present invention provides a water management scheme for a fuel cell and/or fuel cell assembly in which the turns in a flow channel of a fluid flow plate are used for multi-point per flow channel addition, removal, and/or redistribution of water for regulation of the humidity of a stream of reactant gas and/or a stream of reactant gas and water droplets. Such a water management scheme is adaptable to providing a generally uniform and sufficient membrane hydration and/or cooling of an individual fuel cell, as well as providing a generally uniform and sufficient membrane hydration and/or cooling of a plurality of fuel cells throughout the length of a fuel cell assembly.

In accordance with the principles of the present invention, a fuel cell is provided with a novel fluid flow plate which is operable to distribute a reactant gas to a membrane of the fuel cell, and to supply, remove, and/or redistribute water for regulating the humidity of the reactant gas for membrane hydration and/or to provide water for cooling the fuel cell. The fluid flow plates of the present invention may include a surface having at least one flow channel with one or more turns, e.g., a flow channel having a serpentine configuration. Water is effectively and readily added to, removed and/or redistributed from a reactant gas through the flow plate which forms an outer lateral portion of one or more turns. As used herein, the term "reactant gas" includes, e.g., fuel, or oxidant, or a two-phase flow comprising fuel or oxidant and liquid water.

Figure 1:
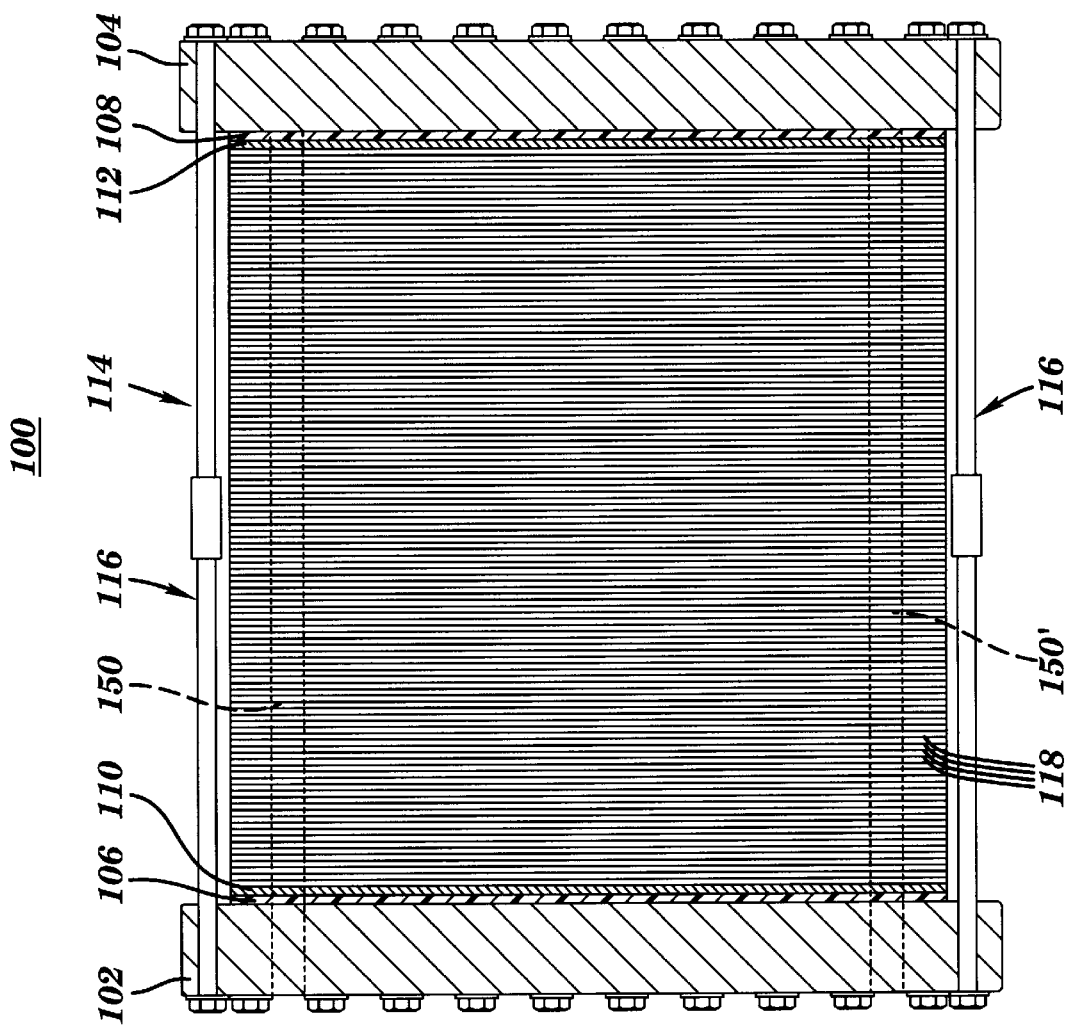
FIG. 1 is a sectional, side elevational view of one example of a fuel cell assembly incorporating and using fluid flow plate(s) of the present invention.

An example of a fuel cell assembly incorporating novel features of the present invention is depicted in FIG. 1. In this exemplary embodiment, a fuel cell assembly 100 includes end plates 102 and 104, insulation layers 106 and 108, and current collector/conductor plates 110 and 112, with a working section 114 therebetween. The working section includes one or more active sections and can include a selected number of cooling sections, as will be understood by those skilled in the art. In one aspect of the present invention, the one or more active sections can further serve to perform cooling for the fuel cell assembly. A number of structural members 116 can be employed to join end plate 102 to end plate 104.

Working section 114 includes a number of layers 118. The layers generally form fluid manifolds 150 and 150' for supplying reactant gas or fluids to, removing fluids from, and otherwise communicating and/or servicing fluids as desired within working section 114, as will be appreciated by those skilled in the art. The layers of fuel cell assembly 100 might have applied thereto compressive forces which are approximately fifty to one thousand pounds per square inch, and, preferably, two hundred to four hundred pounds per square inch.

Figure 3:
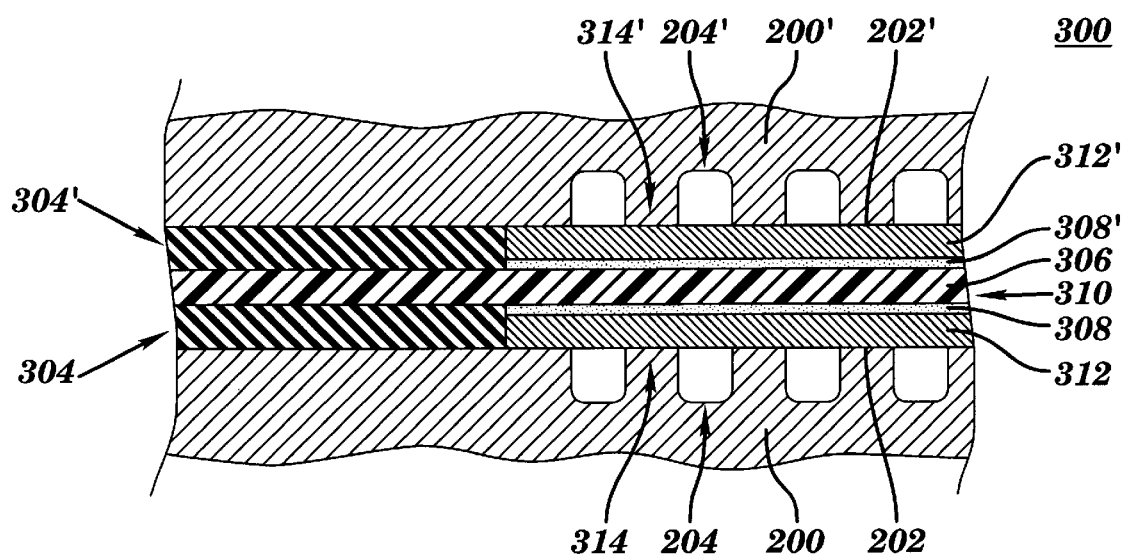
FIG. 3 is a partial, enlarged, sectional, side elevation view of the fluid flow plates in a fuel cell of the fuel cell assembly shown in FIG. 1.

A plurality of layers 118 may form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
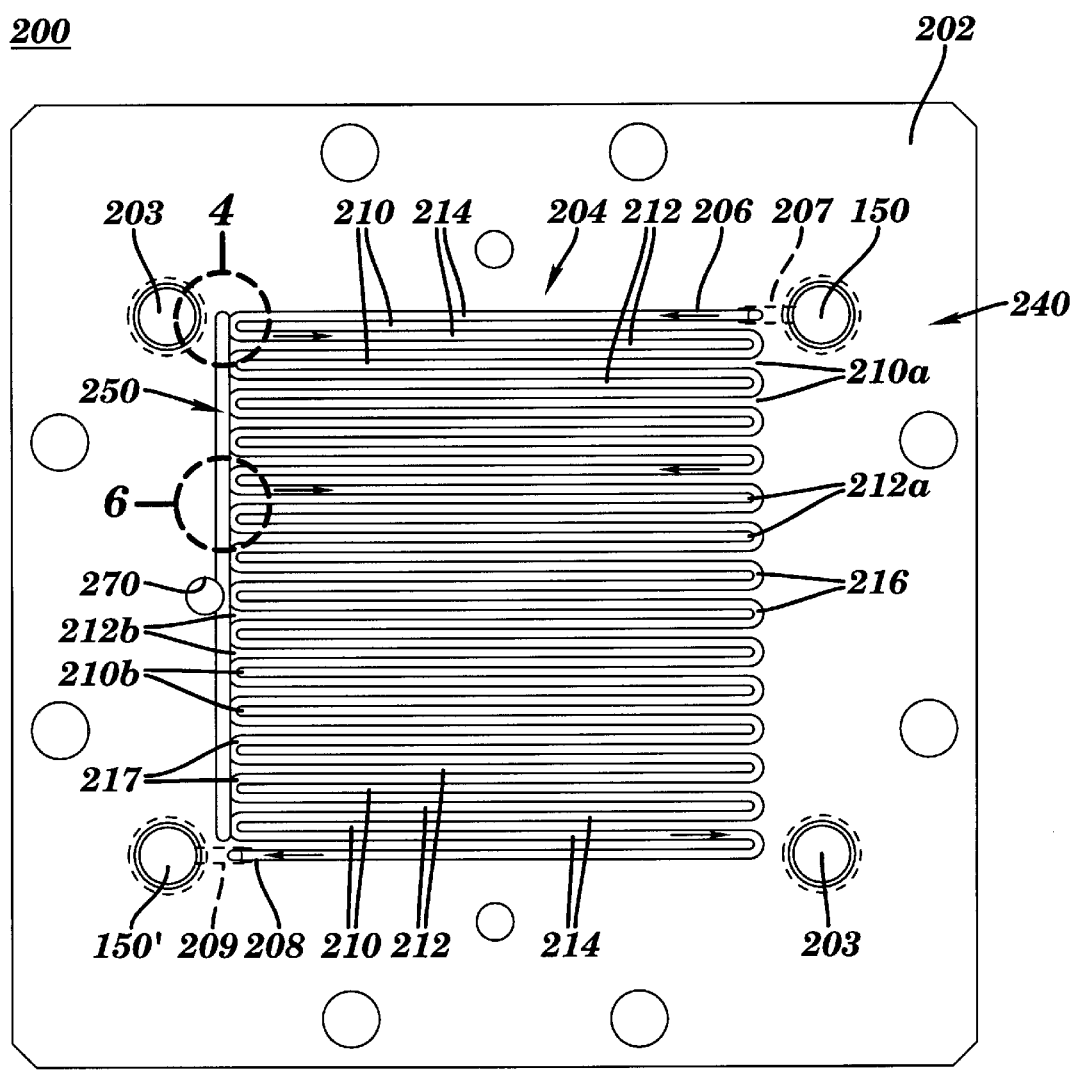
FIG. 2 is a plan view of a surface of one embodiment of a fluid flow plate according to the present invention for use in the fuel cell assembly shown in FIG. 1.

One example of a layer 118 of working section 114 is depicted in FIG. 2 as a fluid flow plate 200. Fluid flow plate 200 has a fluid flow face 202 with at least one generally serpentine flow channel 204 thereon. Flow channel 204 receives and transmits one or more fluids through an inlet 206 and out an outlet 208 which are in fluid communication with corresponding fluid entry manifold 150 and fluid exit manifold 150'.

Inlet 206 and outlet 208 may each comprise a hole (not shown) which extends through the thickness of fluid flow plate 200, e.g., transversely or on an angle, and which opens onto cutouts 207 and 209 (shown in dashed lines), respectively, on the opposite side of the fluid flow plate. Cutouts 207 and 209 open onto entry fluid manifolds 150 and exit manifold 150', respectively. Such a configuration and other equally suitable configurations for fluidly connecting the fluid supply manifolds to the flow channel are further described in the above-identified U.S. Patent Applications.

As will be understood by those skilled in the art, a given fluid flow plate 200 may be a bipolar, monopolar, or combined monopolar (e.g., anode cooler or cathode cooler). In one example, fluid flow plate 200 serves as a flow field plate and flow channel 204 conducts fluid which includes reactant gas for fuel cell assembly 100 (FIG. 1). The reactant gas serves as fuel or oxidant for a given fuel cell 300 (FIG. 3). For instance, the flow channel can carry reactant gas (e.g., a fuel such as hydrogen or an oxidant such as air/oxygen) as well as a liquid (e.g., humidification and/or product water), as will be understood by those skilled in the art.

Fluid flow plate 200 might have a height which is preferably in the range 1.0 to 20.0 in., and is most preferably in the range 8.0 to 10.0 in. Additionally, the width of the fluid flow plate is preferably in the range 1.0 to 20.0 in., and is most preferably in the range 7.0 to 9.0 in. Further, the thickness of the fluid flow plate is preferably in the range 0.02 to 0.30 in., and is most preferably in the range 0.05 to 0.15 in. Also, the cross-sectional dimension of width of flow channel 204 on face 202 is preferably in the range 0.01 to 0.10 in., and is most preferably in the range 0.02 to 0.05 in., with the cross-sectional dimension of depth of the flow channel preferably in the range 0.002 to 0.050 in., and most preferably in the range 0.010 to 0.040 in. In addition, the cross-sectional dimension of width of a land separating adjacent flow channel sections, for example, land 314 and 314' (FIG. 3), is preferably in the range 0.01 to 0.10 in., and is most preferably in the range 0.02 to 0.05 in.

With reference still to FIG. 2, fluid flow plate 200 has a number of peripheral holes 203 therethrough, which can cooperate in formation of fluid supply manifolds of fuel cell assembly 100, e.g., for supply of reactant gas to the opposite side of fluid flow plate 200. Preferably, the perimeters of layers 118 (FIG. 1) are formed with minimal amounts of material disposed generally transversely beyond the active extent of working section 114 as well as the fluid supply manifolds of fuel cell assembly 100, as represented in FIG. 2.

Referring to FIG. 3, gasketing material or gaskets 304 and 304' can be employed to seal peripheral holes 150, 150', 155, and 155' (FIG. 2) and cooperate with the longitudinal extents of layers 118 (FIG. 1) in formation of the fluid supply manifolds. A given gasket 304 and 304' might take the form of, for instance, a frame gasket made from a polytetrafluoroethylene ("PTFE") material manufactured by E. I. Du Pont de Nemours Company and sold under the trademark TEFLON®. In another embodiment, multiple O-ring gaskets might be employed.

For purposes of illustration, FIG. 3 depicts fuel cell 300 with fluid flow plates 200 and 200' serving as flow field plates. In particular, fluid flow plate 200 might serve as an anode side of the fuel cell, and fluid flow plate 200' might serve as a cathode side of the fuel cell. That is, face 202 of fluid flow plate 200 might be an anode face, and face 202' of fluid flow plate 200' might be a cathode face. For instance, flow channel 204 of fluid flow plate 200 might carry hydrogen, as fuel, and humidification water. Further, a flow channel 204' of fluid flow plate 200' might carry air/oxygen, as oxidant, as well as humidification water and/or product water, as will be understood by those skilled in the art.

Fuel cell 300 includes a membrane or solid electrolyte 306. Preferably, solid electrolyte 306 is a solid polymer electrolyte made using a polymer such as a material manufactured by E. I. Du Pont de Nemours Company and sold under the trademark NAFION®. Further, an active electrolyte such as sulfonic acid groups might be included in this polymer. In another example, the solid polymer electrolyte might be formed with a product manufactured by W.L. Gore & Associates (Elkton, Md.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed with a product manufactured by W.L. Gore & Associates and sold under the trade designation PRIMEA 5510-HS.

MEA 310 is sandwiched between anode and cathode gas diffusion layers (hereinafter "GDLs") 312 and 312', respectively, which can be formed with a resilient and conductive material such as carbon fabric or carbon fiber paper. In one embodiment of gas diffusion layers 312 and 312', porous carbon cloth or paper is infused with a slurry of carbon black and sintered with TEFLON® material.

The anode and cathode GDLs serve as electrochemical conductors between catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of the MEA a combination of microscopic porosity and macroscopic porosity. Microscopic porosity allows reactant gas molecules to pass generally longitudinally from the flow channel to a surface of the MEA. Macroscopic porosity allows product water formed at the cathode surface of the MEA to be removed therefrom by flowing generally longitudinally into the cathode flow channel, to prevent flooding of the catalyst particles.

With reference again to FIG. 2, fluid flow plate 200 according to the present invention includes surface 202 having serpentine flow channel 204. While a single continuous flow channel is illustrated in FIG. 2, it will be appreciated by those skilled in the art that the various embodiments of the fluid flow plates according to the present invention may include a plurality of continuous flow channels, e.g., a fluid flow plate having four quadrants, each with portions of a flow channel and/or separate flow channels.

In this illustrated embodiment, fluid flow plate 200 comprises a generally non-porous, planar, base portion 240 and a generally porous, elongated, strip portion 250 which together cooperate in defining flow channel 204. Generally non-porous portion 240 of fluid flow plate 200 may include a plurality of substantially straight and parallel ribs 210 and 212 which define a number of substantially straight and parallel intermediate flow channel sections 214 therebetween. Outer peripheral portions of non-porous portion 240 define sides of the outermost intermediate flow channel sections 214. End portions 210a of ribs 210 are connected and spaced-apart from end portions 212a of ribs 212 to define a plurality of turns 216 which connect intermediate flow channel sections 210 along one side of fluid flow plate 200. Porous portion 250 may be disposed transversely along and in contact with end portions 212b of ribs 212 and spaced-apart from ends 210b of ribs 210 to define a plurality of turns 217 which connect intermediate flow channel sections 214 along an opposite side of fluid flow plate 200. Turns 216 and 217 may be disposed within the active area of the fluid flow plate or outside the active area of the fluid flow plate, e.g., by not superimposing the turn(s) with a gas diffusion layer.

In this exemplary embodiment and the embodiments described below, the non-porous portion may comprise a metallic material, e.g., stainless steel or a resin-impregnated graphite material, and the porous portion may be a separate suitable porous material or wicking material, or other material which transmits water. For example, porous or wicking material may comprise a cotton cheesecloth material, e.g., product number 4436 available from the Carnegie Textile Company of Cleveland, Ohio. Desirably, a porous or wicking material comprises small passageways therethrough which aid water flow via capillary action. In addition, hydrophilic and/or hydrophobic materials and/or coatings may be suitably employed to aid in the addition and/or removal of water from the turns of the flow channel, and to aid in the distribution of water though the length of the porous portion.

As best shown in FIGS. 4 and 5, and in particular FIG. 5, non-porous portion 240 of fluid flow plate 200 may comprise a recess 260 which extends transversely to ends 210b and 212b (FIG. 4) of ribs 210 and 212 (FIG. 2), respectively, for receiving porous portion 250. For example, non-porous portion 240 may comprise recess 260 having a lower horizontally extending surface 262 (which may correspond to a lower horizontal surface 264 of turn 217 and to a lower horizontal surface 266 of the intermediate channel section 214 (FIG.4)), a vertically extending surface 268, and a plurality of vertically extending surfaces 265 (only one of which is shown in FIG. 5) of end portions 212b of ribs 212. In the fabrication of fluid flow plate 200, initially a serpentine flow channel can be milled by a computer numerical control (CNC) milling machine on a surface of a plate. Thereafter, a recess or traversely extending slot can be milled by the CNC milling machine. Alternatively, the fluid flow plate may be injected molded with both the flow channel and the recess formed simultaneously on a surface of a plate.

A water supply inlet 270 (FIG. 2) may be provided which is in fluid communication with porous portion 250. As explained in greater detail below, porous portion 250 distributes a supply of water to a reactant gas passing through flow channel 204 via surfaces 252 of porous portion 250 which define outer lateral portions of turns 217.

Porous portion 250 may extend along the full depth or a portion of the depth of the flow channel, and extend along all of or a portion of turns 217 disposed along a side of fluid flow plate 200.

FIG. 4 illustrates one mode of operation of fluid flow plate 200 to add or introduce water to a stream of dry reactant gas to humidify the reactant gas. For example, an initially dry reactant gas may be introduced into inlet 206 (FIG. 2), e.g., at a pressure of 30 psi. A supply of water may be introduced to inlet 270 (FIG. 2), e.g., at a pressure equal to or slightly greater than the gas pressure.

In this illustrated mode of operation, the reactant gas stream initially having no humidity is received through inlet 206 (FIG. 2) and travels through intermediate flow channel section 214. As the reactant gas passes through turn 217, the dry reactant gas stream along the outer lateral portion of turn 217 picks up water from surface 252 of porous portion 250 to humidify the reactant gas stream which then passes through the next intermediate flow channel section 214 of flow channel 204. The reactant gas water mixture exits the turn with increased moisture content and lower temperature than the dry reactant gas that entered the turn.

The stream of humidified reactant gas then passes through two intermediate flow channel sections 214, e.g., passing twice through the active area of the fuel cell. A portion of the water in the humidified reactant gas humidifies the membrane and/or is heated and the moisture content of the humidified reactant gas is reduced upon its return to the next turn 217, as shown in FIG. 6. As the heated and reduced moisture content reactant gas passes through turn 217, the stream of reactant gas, e.g., reactant gas and water droplets, along the outer lateral portion of turn 217 picks up water from surface 252 of porous portion 250 to increase the humidity of the reactant gas stream which then passes through the next intermediate channel sections 214 of flow channel 204. This process is repeated as the reactant gas continues its way through the serpentine configured flow channel before exiting to exit manifold 150'.

The rate of water transport from porous portion 250 to the stream of reactant gas is a function, e.g., of the operable surface area of the porous portion, the temperature, the differential pressure of the reactant gas and the water supply, the velocity of the reactant gas stream, and the reactant gas moisture content. For example, by providing a dense porous or wicking material for porous portion 250, the supply of water can be operated at a suitable pressure to cause a flow of water to enter the turns of the flow channel and mix and/or be picked up by the reactant gas stream.

With reference to FIGS. 4–6, by varying the cross-sectional dimensions of turns 217 compared to the cross-sectional dimensions of the intermediate flow channel sections 214, it is possible to provide different velocities and pressures in the stream of reactant gas and/or reactant gas and water droplets along the length of flow channel 204. For example, flow channel 204 may comprise constant thickness or depth intermediate flow channel sections 214 and turns 217 (e.g., depth D as shown in FIG. 5). The width of flow channel 204 along the intermediate flow channel sections 214 may have a width W1 and the width midway along turn 217 may have a width W2 which is less than W1.

In this illustrated example, point A may be characterized as having a high pressure/low velocity, and point B may be characterized as having a low pressure/high velocity. Such a configuration provides a lower pressure in the turns which allows a greater introduction of water into the gas stream and reduces the settling rates in the turn compared to a configuration wherein the cross-sectional area of the flow channel is constant throughout its length. From the present description, it will be appreciated by those skilled in the art that the cross-section area of the turn may be reduced compared to the cross-sectional area of the intermediate channel sections by a reduction of the depth of the turn compared to the depth of the intermediate channel section.

Figure 7:
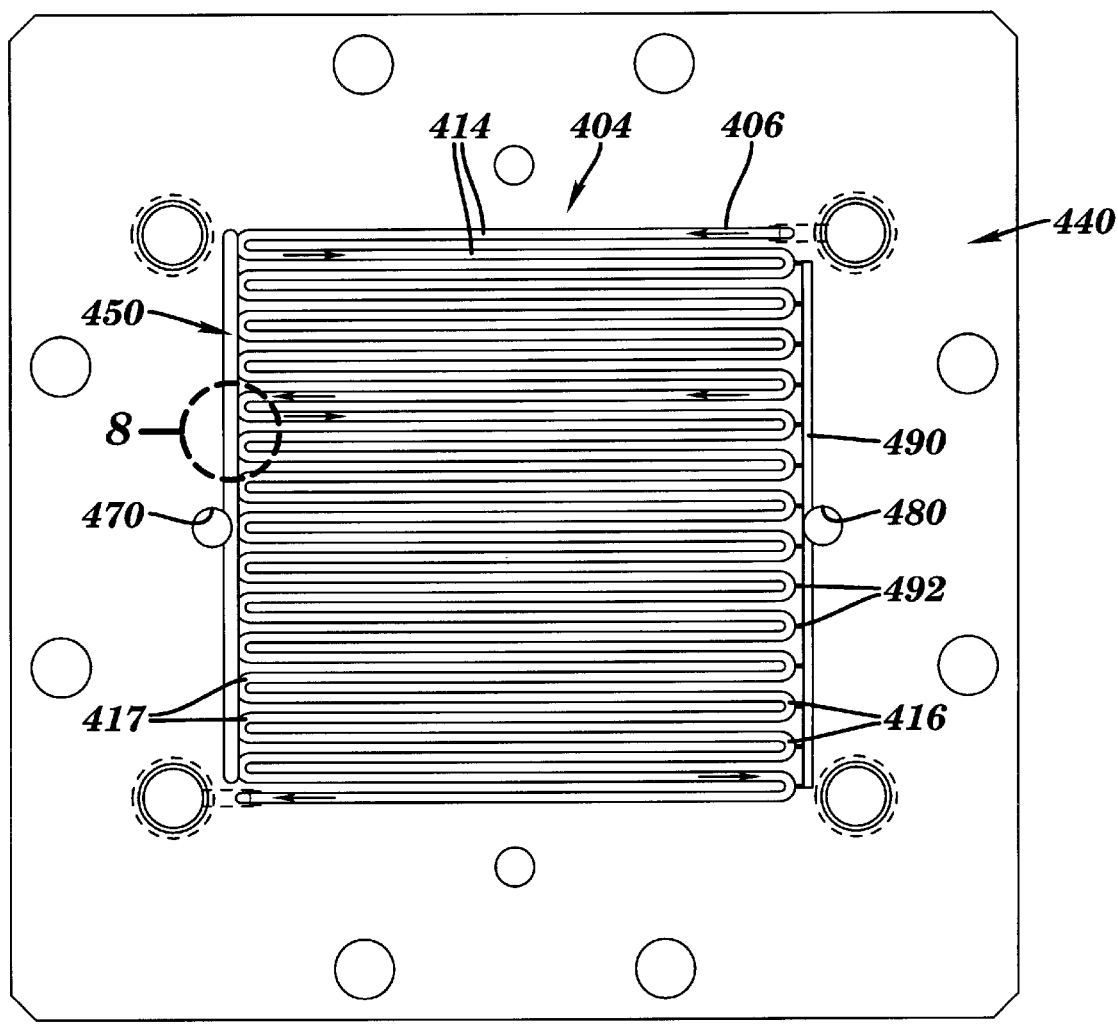
FIG. 7 is a plan view of a surface of a second embodiment of a fluid flow plate according to the present invention.

FIG. 7 shows a second embodiment of a fluid flow plate 400 according to the present invention. In this illustrated embodiment, fluid flow plate 400 comprises a generally non-porous, planar, base portion 440 and a generally porous elongated strip portion 450 which together cooperate to define a serpentine flow channel 404 having a plurality of turns 416 disposed along one side of fluid flow plate 400 and a plurality of turns 417 disposed along an opposite side of fluid flow plate 400. Porous portion 450 may be operably connected to inlet/outlet 470 for receiving and/or removing water.

Non-porous portion 440 of fluid flow plate 400 further comprises a water supply inlet 480 connected to a plate manifold 490, which plate manifold in turn, is connected to a plurality of passageways 492 for multi-point introduction of water into turns 416.

In this illustrated embodiment, plate manifold 490 is connected to turns 416 of flow channel 404 by a plurality of passageways 492 which meter and open onto the portion of non-porous portion 440 which forms the outer lateral portion of turns 416. For example, passageways 492 may comprise a plurality of slots, each of which opens onto the outer lateral portion of fluid flow plate forming turns 416. Passageways 492 may comprise holes which are disposed within the thickness of fluid flow plate 400 and which extend from plate manifold 490 to turns 416. In still another alternative embodiment of a fluid flow plate, a fluid flow plate may comprise two sets of plate manifolds and passageways, both being similar to plate manifolds 490 and passageways 492. For example, one set having a plate manifold and passageways for water injection may be disposed adjacent to the turns along one side of the fluid flow plate and the other set for water removal may be disposed adjacent to the turns along the other side of the fluid flow plate.

In one mode of operation of illustrated fluid flow plate 400 in a fuel cell, a dry reactant gas stream can be supplied to an inlet 406 of flow channel 404, e.g., at a pressure of 30 psi, and water for humidification and/or cooling can be metered and introduced directly into each turn 416, e.g., at a pressure greater than the pressure of the reactant gas. For example, water in excess of the amount required for humidification of the gas, e.g., three times the amount required, can be introduced through passageways 492 so that water droplets are formed for hydrating the membrane, as well as for absorbing heat as the water droplets travel though intermediate flow channel sections 414 and the active area of the fuel cell.

Figure 8:
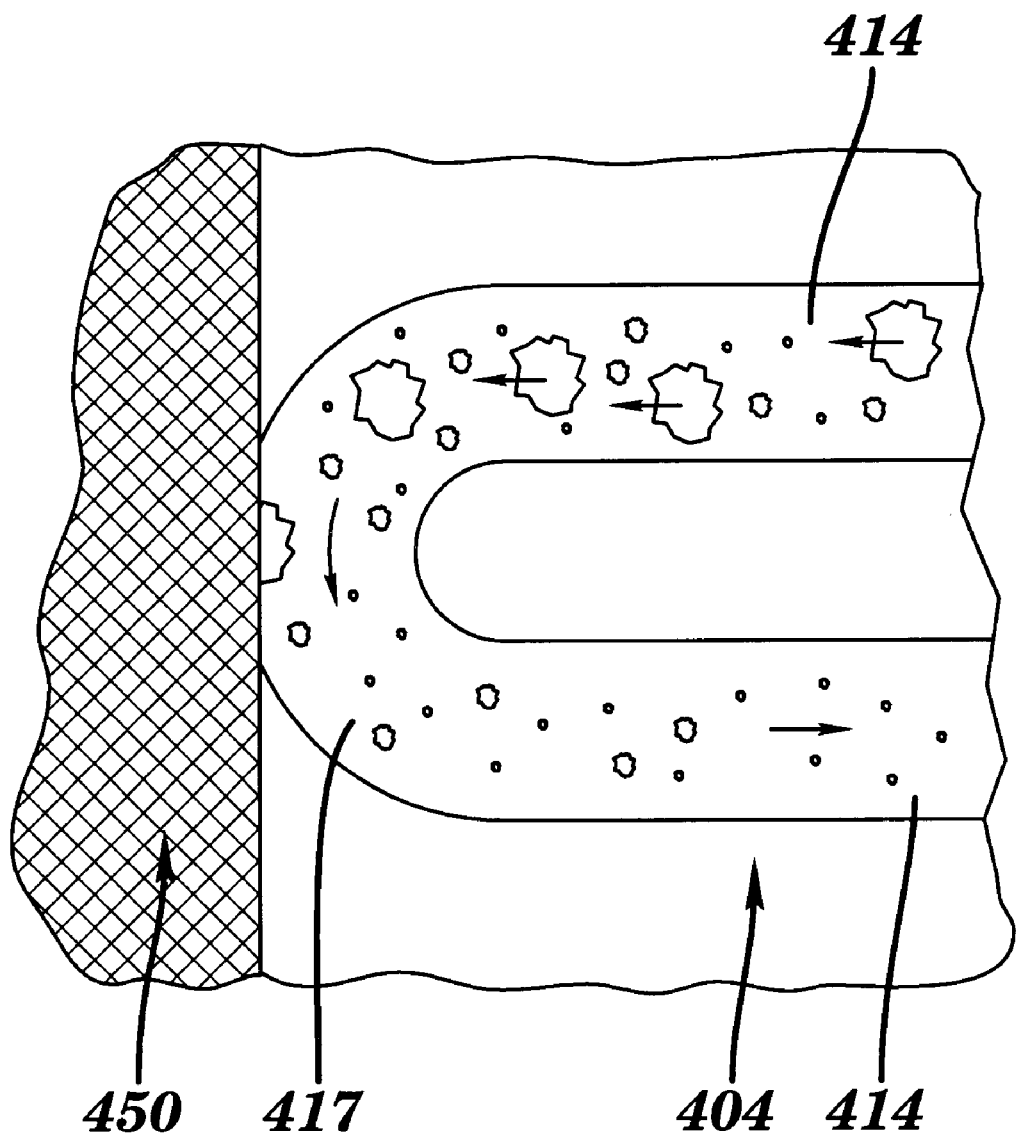
FIG. 8 is an enlarged, partial view of detail 8 of FIG. 7, illustrating the removal of large water droplets to reduce the humidity of a stream of reactant gas and water droplets.

As best shown in FIG. 8, the large water droplets of the two-phase flow (e.g., reactant gas and liquid water) upon passing through turn 417 will impact porous portion 450 and be removed from the reactant gas stream by porous portion 450 of fluid flow plate 400. In particular, the large water droplets have a velocity which has both magnitude and direction. Inertia, the property of matter to remain at rest or in uniform motion (constant speed in a straight line) unless acted upon by some external force, results in the large water droplets in the turns continuing to move with generally the same direction and speed of the large water droplets in the intermediate flow channel sections. The reactant gas in the turns of the flow channel has little, if any, effect on changing the velocity (magnitude and/or speed) of the large water droplets in the turns. Thus, while the gas passing through the turns experiences angular acceleration, the large water droplets, because of its inertia, continues in a generally straight line and impacts porous portion 450. In this method of operation, desirably, porous portion 450 is connected to a inlet/outlet 470 having a water supply operable at a slightly lower pressure than the pressure of the reactant gas.

Figure 9:
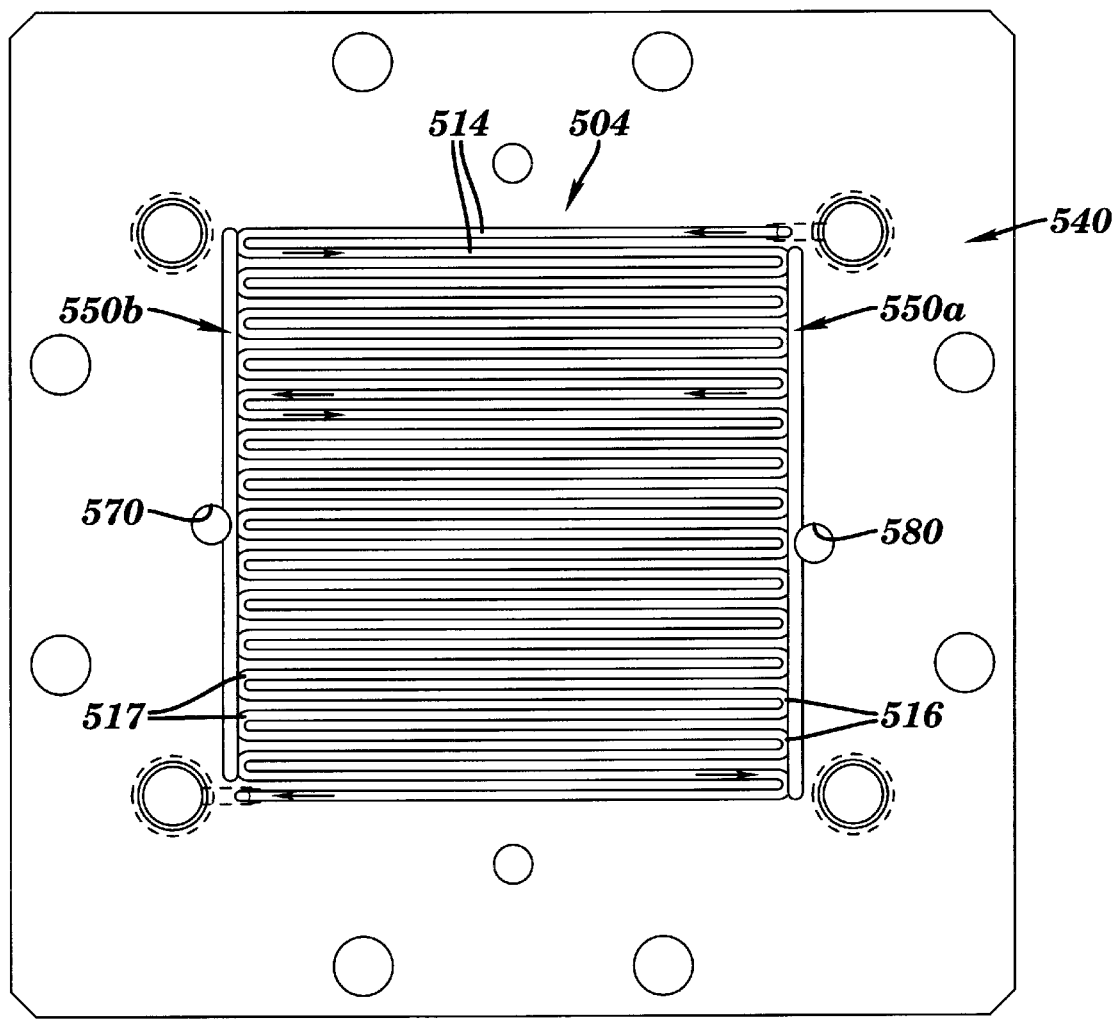
FIG. 9 is a plan view of a surface of a third embodiment of a fluid flow plate according to the present invention.

A third embodiment of a fuel flow plate 500 according to the present invention is shown in FIG. 9.

In this illustrated embodiment, fluid flow plate 500 comprises a generally non-porous, planar, base portion 540, a first generally porous, elongated, strip portion 550a, and a second generally porous, elongated, strip portion 550b, which together cooperate in defining a serpentine flow channel 504 having a plurality of turns 516 disposed along one side of fluid flow plate 500 and a plurality of turns 517 disposed along an opposite side of fluid flow plate 500. Porous portions 550a and 550b define portions of turns 516 and 517, respectively. In addition, porous portion 550a is in fluid communication with an inlet/outlet 580 for receiving or removing a supply of water, and porous portion 550b is in fluid communication with an inlet/outlet 570 for receiving or removing a supply of water.

In one mode of operation of fluid flow plate 500 in a fuel cell, water can be metered and introduced directly into the turns along one side of the fluid flow plate, and removed and/or redistributed along the other side of the fluid flow plate. As discussed above with reference to the embodiment shown in FIGS. 7 and 8, water can be introduced for humidification, as well as cooling along one side of fluid flow plate 500. For example, porous portion 550a and 550b may be separately supplied with water at different pressures. Porous portion 550a may have water supplied at a pressure of 60 psi while porous portion 550b may be open to atmosphere. In this mode of operation, a controlled and limited quantity of reactant gas may also be removed, along with the water, through porous portion 550b.

Water in excess of the amount required for humidification of the gas can be introduced through porous portion 550a so that water droplets are formed for hydrating the membrane and for absorbing heat as the droplets travel through intermediate flow channel sections 514 of flow channel 504, e.g., through the active area, of the fuel cell. Upon passing through turns 517, the larger water droplets will impact porous portion 550b as discussed with reference to FIG. 8.

Figure 10:
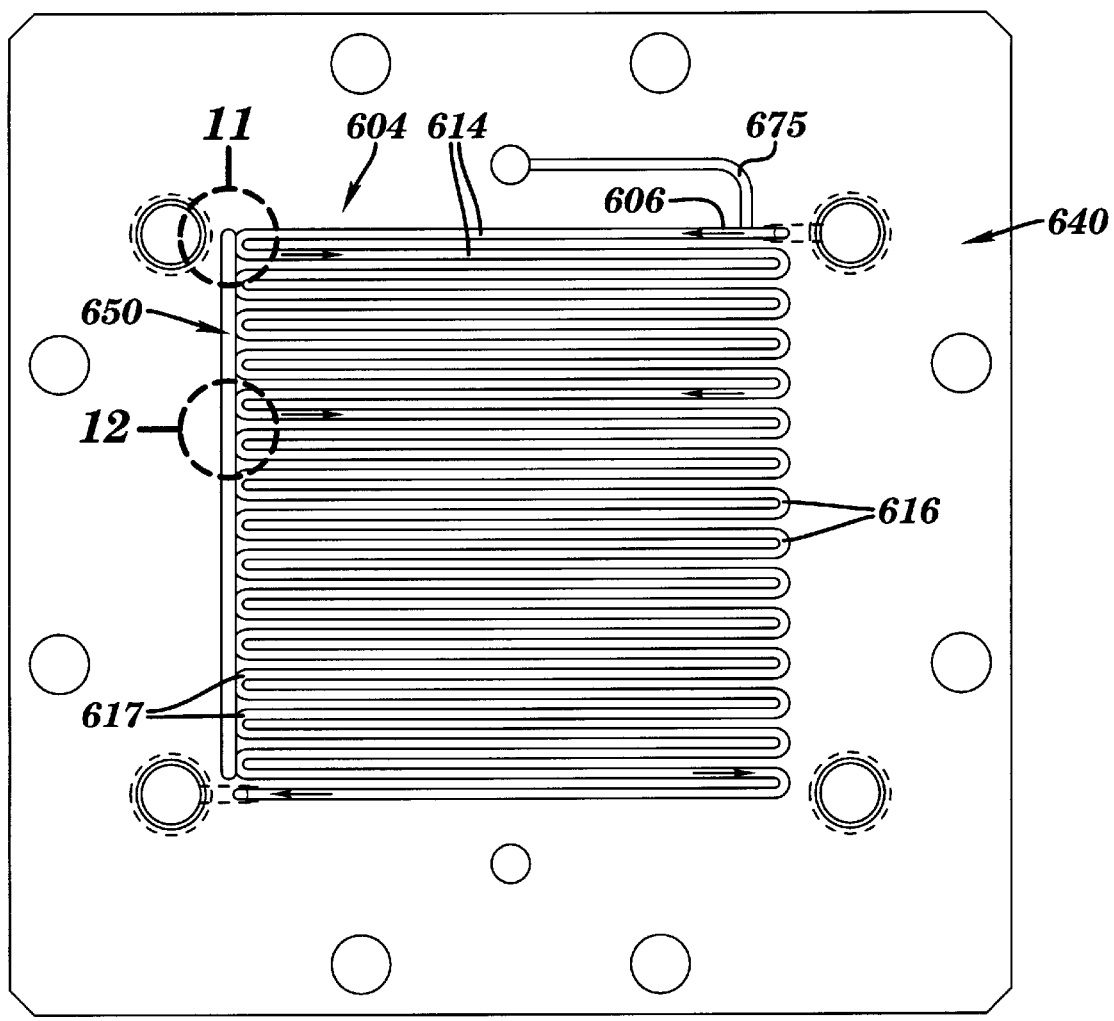
FIG. 10 is a plan view of a surface of a fourth embodiment of a fluid flow plate according to the present invention.

FIG. 10 illustrates a fourth embodiment of a fluid flow plate 600 according to the present invention. In this illustrated embodiment, fluid flow plate 600 comprises a generally non-porous, planar, base portion 640 and a generally porous, elongated, strip portion 650, which together cooperate in defining a serpentine flow channel 604 having a plurality of turns 616 disposed along one side of fluid flow plate 600 and a plurality of turns 617 disposed along an opposite side of fluid flow plate 600.

Non-porous portion 640 may be provided with a water supply inlet 670 operably connected to a plate manifold 675 which operably opens onto an inlet 606 (e.g., at least one port which opens onto inlet 606) for humidifying the stream of reactant gas. Other configurations for fluidly connecting the water supply manifold to the flow channel are further described in the above-identified U.S. Patent Applications. Alternatively, reactant gas may be humidified prior to introduction into inlet 606 of flow channel 604. In this embodiment, porous portion 650 is not connected with an inlet/outlet for addition or removal of water.

Figure 11:
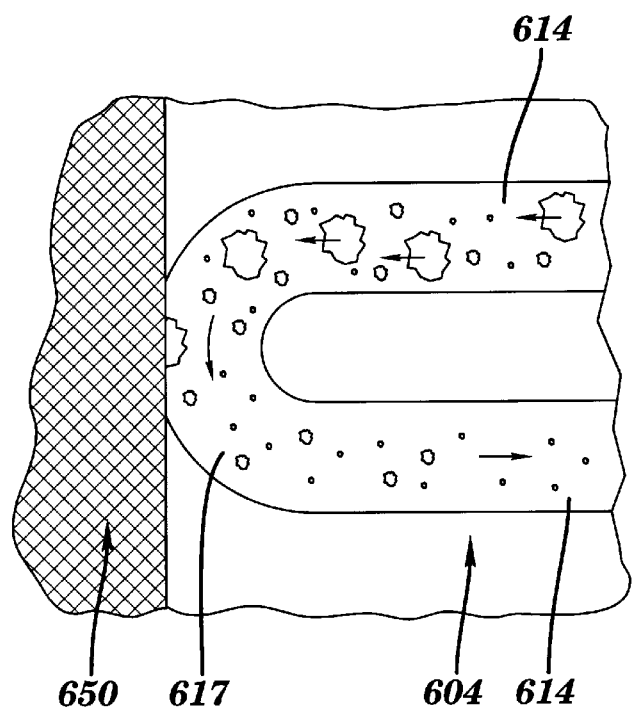
FIGS. 11 and 12 are enlarged, partial views of details 11 and 12 of FIG. 10, illustrating the redistribution of water along different portions of the length of a flow channel to regulate the humidity of a stream of reactant gas and water droplets.

The redistribution of water in the humidified reactant gas, e.g., two-phase flow having reactant gas and liquid water in the form of water droplets, is achieved by the humidified reactant gas traveling through the turns. As shown in FIG. 11, the change in direction imparted on and experienced by the gas portion and small water droplets in the two-phase flow (e.g., gas and liquid water) while passing through the turns allows separation of the large water droplets. For example, the inertia of the large water droplets will cause them to contact porous portion 650 defining the outer portion of turn 617. This mode of operation removes large water droplets that come into contact with the porous portion without creating a flow constriction on the bulk reactant gas stream.

Figure 12:
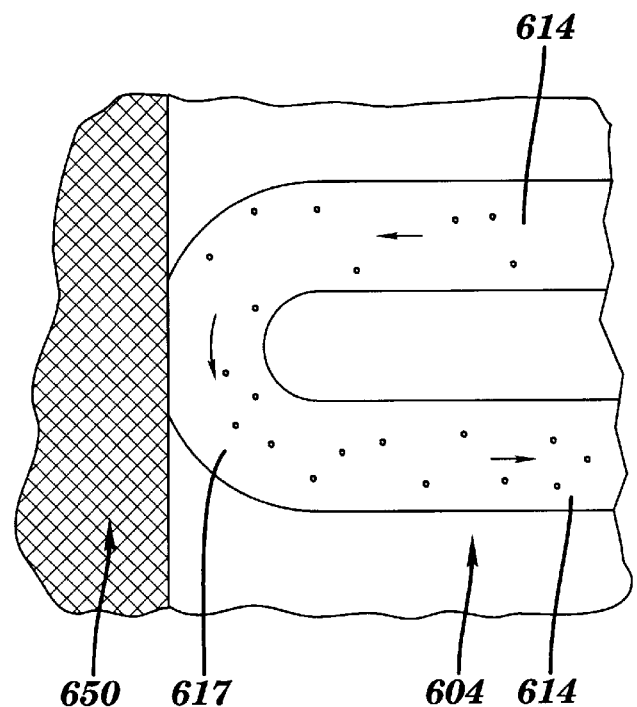

As shown in FIGS. 11 and 12, excess water which is removed from the reactant gas stream is readily transported through porous portion 650 for redistribution into a reduced humidified reactant gas stream (FIG. 12) traveling through one or more subsequent turns 617 disposed between intermediate flow channel sections of flow channel 604.

Figure 13A:
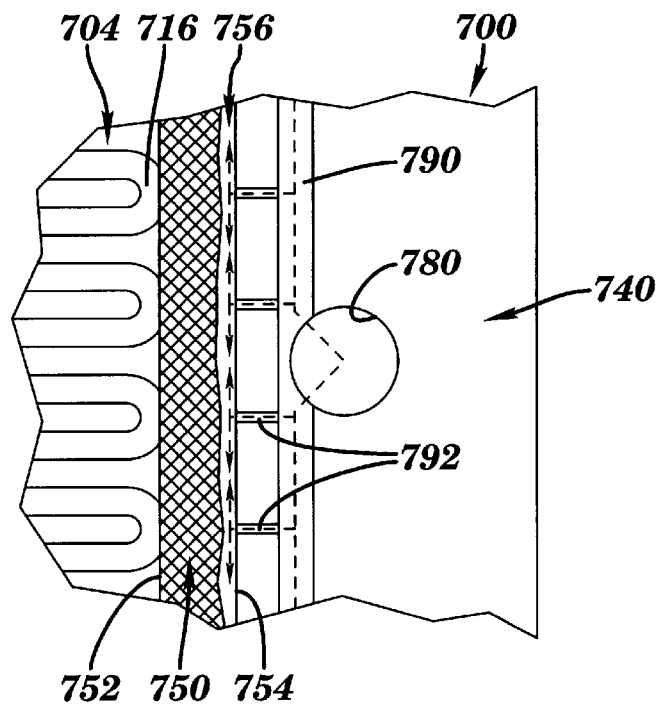
FIGS. 13A and 13B are enlarged, partial, plan views of a surface of a fifth embodiment of a fluid flow plate according to the present invention.
Figure 13B:
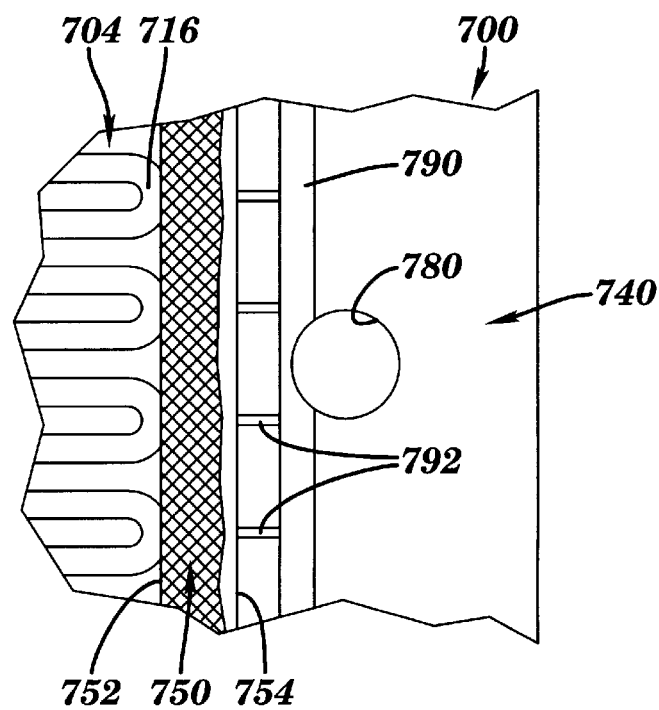

A fifth embodiment of a fluid flow plate 700 according to the present invention is illustrated in FIGS. 13A and 13B. In this illustrated embodiment, fluid flow plate 700 comprises a generally non-porous, planar, base portion 740 and a generally porous, elongated, strip portion 750 which together cooperate to defining a serpentine flow channel 704 having a plurality of turns 716 disposed along one side of fluid flow plate 700 and a plurality of turns (not shown in FIG. 13) disposed along an opposite side of fluid flow plate 700.

Porous portion 750 comprises a first surface 752 in which portions thereof define the outer lateral portion of turns 716. An opposite surface 754 of porous portion 750 is in fluid communication with a water supply inlet 780 via a plate manifold 790 and a plurality of passageways 792.

In this illustrated embodiment, porous portion 750 swells or increases in size when it is saturated or otherwise contains water, and shrinks or decreases in size as it drys. Porous portion 750 may be fabricated from or comprise wool, such as product number SAEF, manufactured and available from All Felt Products, Inc., of Ingleside, Ill.

As shown in FIG. 13B, porous portion 750 swells or expands, so that surface 754 spans across the openings of passageways 792. As shown in FIG. 13A, as porous portion dries it pulls back from the openings of passageways 792 to form a clearance or gap 756 which readily allows water to flow and travel along the length of porous portion 750. As the porous portion 750 becomes saturated, porous portion 750 expands and covers the opening of passageways 792. Such an expandable porous portion provides a self-regulating mechanism for rapidly providing water along the entire length of porous portion 750.

Figure 14:
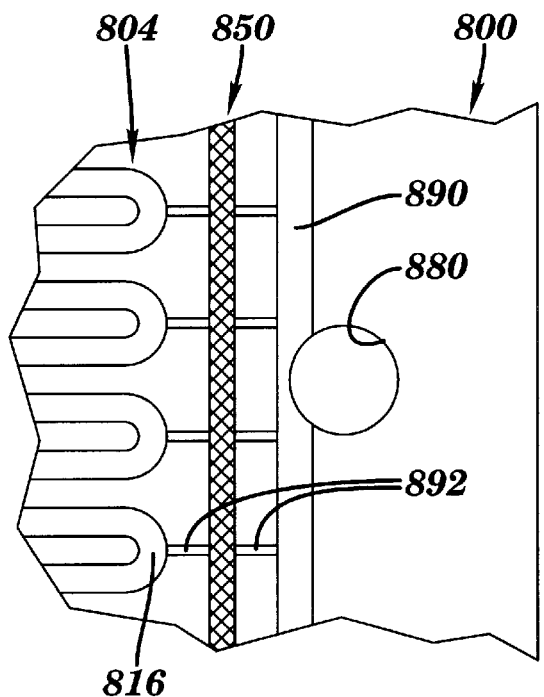
FIG. 14 is an enlarged, partial, plan view of a surface of a sixth embodiment of a fluid flow plate.

FIG. 14 illustrates a sixth embodiment of a fluid flow plate 800 according to the present invention. In this illustrated embodiment water for humidification of a reactant gas is supplied by an inlet 880 and a plate manifold 890 which is connected to turns 816 of a flow channel 804 via passageways 892. Disposed between plate manifold 890 and across passageway 892 is a porous portion 850, e.g., a dense wick, which acts as a damper for supplying water to flow channel 804. That is, water can be supplied to the fluid flow plate at a greater pressure than the pressure of the reactant gas without the risk of flooding the flow channel.

Figure 15:
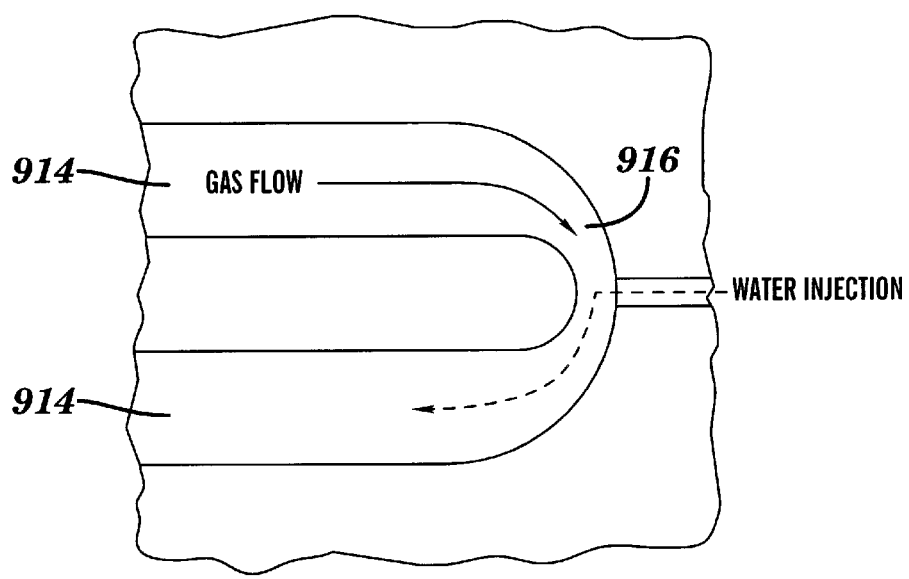
FIG. 15 is an enlarged, partial, plan view of a surface of a seventh embodiment of a fluid flow plate in which a turn of a flow channel is configured as a venturi tube for introduction of water into a flow channel.

The turns of the various embodiments can be geometrically optimized for water addition as shown in FIG. 15. For example, in this embodiment, a turn 916 may comprise a reduced cross-sectional area compared to the cross-sectional area of intermediate flow channel sections 914. As the reactant gas and/or two-phase flow (e.g., reactant gas and liquid water) passes through turn 916 (e.g., a venturi tube), water is drawn into turn 916. By increasing the velocity of the reactant gas stream through turn 916, atomization of the water and/or creation of smaller water droplets is increased compared to a flow channel having a constant cross-sectional area for both the intermediate flow channel sections and the turns.

While the various embodiments have been illustrated as compactly configured monopolar fluid flow plates, from the present description it will be appreciated by those skilled in the art that the various embodiments may include fluid flow plates having a porous portion on each side, e.g., compactly configured bipolar fluid flow plates for addition, removal, and/or redistribution of water for regulating the humidity of reactant gases (e.g., hydrogen/reformate and oxygen/air) distributed on each face of the fluid flow plate and for providing membrane hydration and/or cooling.

In the various embodiments of the present invention, the reactant gas and/or two-phase flow (e.g., reactant gas and liquid water) repeatedly travels through intermediate flow channel sections in the active area of the fuel cell and along the porous or wicking material defining a portion of the outer lateral portion of the turns. Water may be added, removed, and/or redistributed to regulate the humidity of the reactant gas and/or two-phase flow. Furthermore, in the porous or wicking material, evaporation and condensation absorbs or generates thermal energy so that temperature control may also be achieved by controlling water evaporation-condensation. In this way the reactant gas, humidity and temperature may be adjusted repeatedly and continuously to assure a generally uniform humidified gas composition and temperature across the active portion of each single fuel cell of a multiple fuel cell stack assembly. Employing a plurality of such fluid flow plates assures a generally uniform humidified gas composition and temperature across the length of a multiple fuel cell stack assembly.

The above described fluid flow plates of the present invention are suitable for humidifying hydrogen gas or reformate having a large concentration of hydrogen. In addition, the above described fluid flow plates of the present invention are suitable for humidifying oxygen or air, as well as for removing water which accumulates on the cathode side of the membrane and which needs to be removed promptly to maintain oxygen access to the membrane.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

We claim:

1. A fluid flow plate for a fuel cell, said fluid flow plate comprising:

a porous portion and a non-porous portion together forming on a first surface of said plate, a flow channel having at least one turn for distributing a reactant gas in the fuel cell; and said porous portion defining an outer lateral portion of said at least one turn of said flow channel for regulating humidity of the reactant gas in said flow channel.

2. The fluid flow plate according to claim 1, wherein said porous portion is operable to add water to the reactant gas for increasing the humidity of the reactant gas.

3. The fluid flow plate according to claim 1, wherein said porous portion is operable to add water to the reactant gas for cooling the fuel cell.

4. The fluid flow plate according to claim 2, further comprising means for providing a supply of water to said porous portion.

5. The fluid flow plate according to claim 1, wherein said porous portion is operable to remove water from the reactant gas for decreasing the humidity of the reactant gas.

6. The fluid flow plate according to claim 5, further comprising means for providing a supply of water to an inlet of said flow channel.

7. The fluid flow plate according to claim 1, wherein said flow channel comprises a plurality of turns, and said porous portion forms an outer lateral portion of said plurality of turns, and wherein said porous portion is operable to redistribute water from one of said plurality of turns to a different one of said plurality of turns of said flow channel.

8. The fluid flow plate according to claim 1, wherein said porous portion comprises a wicking material.

9. The fluid flow plate according to claim 1, wherein said porous portion comprises a material which expands when saturated with water and which contracts when dried.

10. The fluid flow plate according to claim 1, wherein said flow channel comprises a serpentine configuration having a plurality of turns with at least one first turn and at least one second turn, and wherein said porous portion defines an outer lateral portion of said at least one first turn.

11. The fluid flow plate according to claim 9, further comprising means for providing a supply of water to said at least one second turn.

12. The fluid flow plate according to claim 11, wherein said means for providing a supply of water comprises a passageway opening into said at least one second turn.

13. The fluid flow plate according to claim 11, wherein said means for providing a supply of water comprises at least one slot opening into said at least one turn.

14. The fluid flow plate according to claim 10, further comprising a second porous portion forming an outer lateral portion of said at least one second turn.

15. The fluid flow plate according to claim 14, wherein said first porous portion is operable at a first pressure to add water to the reactant gas for increasing the humidity of the reactant gas, and said second porous portion is operable at a second pressure to remove water from the reactant gas for decreasing the humidity of the reactant gas.

16. The fluid flow plate according to claim 1, wherein said turn is disposed between intermediate channel sections, and a transverse cross-sectional area of said at least one turn is less than the transverse cross-sectional area of said intermediate channel section of said flow channel.

17. The fluid flow plate according to claim 1, wherein said fluid flow plate comprises a second surface having a flow channel for distributing a second reactant gas.

18. The fluid flow plate according to claim 17, further comprising a second porous portion, said non-porous portion and said second porous portion together forming said flow channel with at least one turn for distributing the second reactant gas, and said second porous portion defining an outer lateral portion of said at least one turn of said flow channel for regulating the humidity of the second reactant gas.

19. A fluid flow plate for a fuel cell, comprising:
   a plate having a flow channel with at least one turn for distributing a reactant gas in the fuel cell, said plate having a plate portion defining an outer lateral portion of said at least one turn; and
   means for providing a supply of water to said flow channel via said outer lateral portion defined by said plate portion.

20. The fluid flow plate according to claim 19, wherein said means for providing a supply of water comprises a passageway which opens onto said plate portion.

21. The fluid flow plate according to claim 19, wherein said means for providing a supply of water comprises a slot which opens onto said plate portion.

22. The fluid flow plate according to claim 19, wherein said at least one turn is disposed between intermediate channel sections, and a transverse cross-sectional area of said at least one turn is less than the transverse cross-sectional area of said intermediate channel sections.

23. The fluid flow plate according to claim 19, wherein said flow channel comprises a serpentine configuration having said at least one turn comprising a first plurality of turns disposed adjacent to a first edge of said fluid flow plate, a second plurality of turns disposed adjacent to a second opposite edge of said fluid flow plate, and wherein said means for providing a supply of water to said flow channel via said plate portion comprises providing a supply of water to said first plurality of turns via said plate portion.

24. The fluid flow plate according to claim 19, wherein said means for providing a supply of water comprises a means for dampening the flow of water to said at least one turn.

25. The fluid flow plate according to claim 24, wherein said means for dampening the flow of water comprises a porous or wicking material.

26. A fuel cell comprising:
   a PEM membrane comprising a first surface and a second surface;
   a first fluid flow plate according to claim 1 for distributing and regulating the humidity of a first reactant gas to said first surface of said membrane; and
   a second fluid flow plate for distributing a second reactant gas to said second surface of said membrane.

27. A fuel cell comprising:
   a PEM membrane comprising a first surface and a second surface;
   a first fluid flow plate according to claim 1 for distributing and regulating the humidity of a first reactant gas to said first surface of said membrane; and
   a second fluid flow plate according to claim 1 for distributing a second reactant gas to said second surface of said membrane.

28. A fuel cell comprising:
   a PEM membrane comprising a first surface and a second surface;
   a first fluid flow plate according to claim 19 for distributing and humidifying a first reactant gas to said first surface of said membrane; and
   a second fluid flow plate for distributing a second reactant gas to said second surface of said membrane.

29. A fuel cell comprising:
   a PEM membrane comprising a first surface and a second surface;
   a first fluid flow plate according to claim 19 for distributing and humidifying a first reactant gas to a first surface of said membrane; and
   a second fluid flow plate according to claim 19 for distributing a second reactant gas to said second surface of said membrane.

30. The fuel cell according to claim 28, wherein said first fluid flow plate comprises a flow channel having a plurality of turns, and in which a porous portion forms outer lateral portions of said plurality of turns for redistributing water from one of said plurality of turns to a different one of said plurality of turns of said flow channel.

31. A method for regulating the humidity of a reactant gas in a fuel cell, said method comprising the steps of:
   flowing a reactant gas through a flow channel comprising at least one turn; and
   regulating the humidity of said reactant gas through an outer lateral portion of said at least one turn.

32. The method according to claim 31, wherein said step of regulating the humidity of said reactant gas comprises the step of removing water via a porous material defining said outer lateral portion of said at least one turn.

33. The method according to claim 31, wherein said step of regulating the humidity of said reactant gas comprises the step of adding water via a porous material defining said outer lateral portion of said at least one turn.

34. The method according to claim 31, wherein said step of flowing a reactant gas through a flow channel comprises flowing said reactant gas through a plurality of turns in which a porous material forms an outer lateral portion of each of said plurality of turns, and wherein said step of regulating the humidity of said reactant gas comprises redistributing water via said porous material from one of said plurality of turns to a different one of said plurality of turns of said flow channel.

35. A method for forming a fluid flow plate of a fuel cell, said method comprising the steps of:

forming a flow channel having at least one turn on a first surface of said plate; and defining an outer lateral portion of said at least one turn with a porous portion of said plate.

36. The method according to claim 35, wherein said step of forming said flow channel comprises the steps of forming a flow channel having a serpentine configuration, and forming a recess in which said porous material is receivable to define said porous portion of said plate.

37. The method according to claim 35, wherein said step of forming said flow channel further comprises the steps of forming said flow channel having a plurality of turns on said first surface of said plate, and defining an outer lateral portion of each of said plurality of turns with said porous portion of said plate.

38. The method according to claim 37, wherein said porous portion of said plate fluidly connects outer lateral portions of said plurality of turns.

* * * * *